United States Patent Office 3,709,954
Patented Jan. 9, 1973

3,709,954
PREPARATION OF LIQUID POLYMERS
OF OLEFINS
Frederick J. Karol, Somerset, and George L. Karapinka, Piscataway, N.J., assignors to Union Carbide Corporation, New York, N.Y.
No Drawing. Filed Mar. 16, 1970, Ser. No. 20,156
Int. Cl. C08c 3/10
U.S. Cl. 260—683.15 D         3 Claims

ABSTRACT OF THE DISCLOSURE

Liquid polymers of olefins, and in particular liquid polymers of ethylene, are prepared by polymerizing olefin monomer by contacting the olefin charge with a supported bis-(cyclopentadienyl)chromium[II] catalyst in an inert organic solvent, in the absence of chain transfer agents, at a temperature of ≥140° C. and at a pressure of about 0 to 1000 p.s.i.g.

BACKGROUND OF THE INVENTION

(1) Field of the invention

The invention relates to the preparation of liquid polymers of olefins.

(2) Description of the prior art

Belgian Pat. 723,775 discloses the preparation of polymers of ethylene using, as a polymerization catalyst, an inorganic oxide supported bis(cyclopentadienyl)chromium[II] compound. The polymer preparations disclosed in such patent all relate to the preparation of solid polymeric materials, including waxes.

From the point of view of utility, liquid olefin polymers are recognized as having fields of use which are different than those in which there is employed waxy or other solid polymeric materials made from the same monomers. Applications for which the liquid polymeric materials may be used, and for which the waxy or other solid polymeric materials are not used, include organic lubricants, fuel for combustion purposes, organic solvents and cleaning agents.

Prior to the present invention it has been difficult to readily provide liquid polymers of olefins such as ethylene at high rates of productivity by direct polymerization with a supported catalyst.

SUMMARY OF THE INVENTION

Olefins such as ethylene are polymerized to provide liquid polymers by contacting the monomeric charge in an inert organic solvent and in the absence of chain transfer agent, with catalytic quantities of an inorganic oxide supported bis(cyclopentadienyl)chromium[II] catalyst, at a temperature ≥140° C. and at a pressure of about 0 to 1000 pounds per square inch gauge (p.s.i.g.).

An object of the present invention is to provide a process whereby liquid polymers of olefins such as ethylene may be readily prepared in a one step process with a high degree of productivity.

DESCRIPTION OF THE PREFERRED EMBODIMENT

It has now been found that liquid polymers of olefins such as ethylene may be readily provided in high yields if the monomeric charge is polymerized by contacting it with a catalytic quantity of an inorganic oxide supported bis(cyclopentadienyl)chromium[II] catalyst while conducting the polymerization in an inert organic solvent, in the absence of a chain transfer agent, at a temperature of ≥140° C., and at a pressure of about 0 to 1000 p.s.i.g.

The monomers

The monomers which are used in the monomeric charge being polymerized in accordance with the present invention may be one or more alpha-olefins containing 1 to about 8, inclusive, carbon atoms. The monomers may be mono-olefins or di-olefins.

The mono-olefins would include ethylene, propylene, butene-1, pentene-1, 3-methylbutene-1, hexene-1, 4-methylpentene-1, 3-ethyl-butene-1, heptene-1, octene-1, decene-1, 4,4-dimethylpentene-1, 4,4-diethylhexene-1, 3,4-dimethylhexene-1, 4-butyl-1-octene, 5-ethyl-1-decene, 3,3-dimethyl-butene-1, and the like. Among the diolefins which may be used are butadiene, 1,5-hexadiene, dicyclopentadiene, ethylidene norbornene, and the like.

The polymers

The polymers which are prepared in accordance with the teachings of the present invention are liquid materials which contain about 6 to 30 units of the monomer(s) being polymerized. As such, the polymers have molecular weights of the order of about 168 to 5000. The preferred polymers are polymers of ethylene, homopolymers and interpolymers, containing about 6 to 30 interpolymerized ethylene units. As such, these polymers will have a molecular weight of about 168 to about 840, for the homopolymers, and a somewhat higher value for the interpolymers. The term "liquid" means that the polymers can be poured near room temperature, 25–30° C.

The polymers are readily soluble in the organic solvents in which the polymerization reaction is conducted.

The most preferred polymers are homopolymers of ethylene, and copolymers containing at least 60% by weight of ethylene and up to 40% by weight of one or more other mono- and/or diolefin which may be interpolymerized therewith.

The catalyst

The catalyst which is to be used in the present invention is an inorganic oxide supported bis(cyclopentadienyl)chromium[II] catalyst. About 0.001 to 10% by weight of the catalyst is used, based on the total weight of the monomer charge being polymerized.

The catalyst species comprises an organometallic bis-(cyclopentadienyl)chromium[II] compound deposited on an inorganic oxide support.

About 0.1 to 10% by weight of the organometallic compound is used on the support, based on the combined weight of the organometallic compound and the inorganic oxide support.

The bis(cyclopentadienyl)chromium[II] compound has the structure

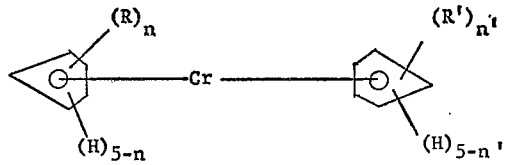

where R and R' may be the same or different $C_1$ to $C_{20}$, inclusive, hydrocarbon radicals, and $n$ and $n'$ may be the same or different integers of 0 to 5, inclusive. The R and R' hydrocarbon radicals may be saturated or unsaturated. They may include aliphatic, alicyclic and aromatic radicals such as methyl, ethyl, propyl, butyl, pentyl, cyclopentyl, cyclohexyl, allyl, phenyl and naphthyl radicals.

The bis(cyclopentadienyl)chromium[II] compounds which may be used as catalysts on the inorganic oxide supports in accordance with the present invention may be prepared as disclosed in U.S. 2,870,183 and U.S. 3,071,605.

The inorganic oxide materials which may be used as a support for the organometallic compounds are materials having a high surface area, that is, a surface area in the range of about 50 to about 1000 square meters per gram. The inorganic oxides which may be used include silica, alumina, thoria, zirconia and other comparable inorganic oxides, as well as mixtures of such oxides.

Because bis(cyclopentadienyl)chromium[II] is sensitive to moisture, the catalyst support should be completely dried before it is brought into contact with the organochromium compound. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the adsorbed water from the support while at the same time avoiding such heating as will remove all of the chemically bound water from the support. The passage of a stream of dry inert gas through the support during the drying aids in the displacement of the water from the support. Drying temperatures of from about 200° C. to 1000° C. for a short period of about six hours or so should be sufficient if a well dried inert gas is used, and the temperature is not permitted to get so high as to completely remove the chemically bound hydroxyl groups on the surface of the support.

Any grade of support can be used but microspheroidal intermediate density (MSID) silica having a surface area of 258 square meters per gram and a pore diameter of about 288 A., and intermediate density (ID) silica having the same area but a pore diameter of 164 A. are preferred. Other grades such as the G–968 silica and G–966 silica-alumina, as designated by W. R. Grace and Co., having surface areas of 700 to 500 square meters per gram, respectively, and pore diameters of 50–70 A. are also quite satisfactory. Variations in molecular weight control and in polymer productivity can be expected between different grades of supports.

The supported catalysts can be prepared by a slurry technique where the selected and properly dried support is added under conditions which exclude the presence of air and moisture to a solution containing the bis(cyclopentadienyl)chromium[II] and an organic solvent to form a slurry. The slurry may be stirred for a period of up to about 4 hours to obtain good adsorption of the bis(cyclopentadienyl)chromium[II] on the support. The catalyst may then be added in such slurry to the vessel in which the polymerization is to be conducted.

The polymerization process

After the composite catalyst has been formed, the polymerization reaction is conducted by contacting the monomer charge in an inert organic solvent, substantially in the absence of catalyst poison and chain transfer agents, with a catalytic amount of the catalyst at a temperature and at a pressure sufficient to initiate the polymerization reaction. The inert organic solvent is used as a diluent and to facilitate materials handling.

The polymerization reaction is carried out at temperatures of from about 140° C. up to about 200° C. or more, depending to a great extent on the operating pressure, the pressure of the monomer charge, the particular catalyst being employed and its concentration. Naturally, the selected operating temperature is also dependent upon the desired molecular weight of the polymer since temperature is a major factor in adjusting the molecular weight of the polymer. The pressure can be any pressure sufficient to initiate the polymerization of the monomers to liquid polymers, and it can be subatmospheric pressure, using an inert gas as a diluent, but the preferred pressure is from atmospheric up to about 1000 p.s.i.g. As a general rule, a pressure of about 20 to 800 p.s.i.g. is preferred.

The inert organic solvent medium employed in this invention should be inert to the composite catalyst, the monomer(s) and the polymers that are produced, and be stable at the reaction temperature used. Among the inert organic solvents applicable for such purpose may be mentioned saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like, and chlorinated hydrocarbons, such as chlorobenzene, tetrachloroethylene, ortho-dichlorobenzene, and the like. Particularly prefered solvent media are cyclohexane, pentane, hexane and heptane.

About 0.1 to 50 parts by volume of solvent are used per part by volume of monomer used, or polymer produced.

Solvents constitute one of the most significant and vexing sources of catalyst poisoning. Moreover, in prior solution polymerization processes employing transition metal-containing catalysts, the use of large quantities of solvent, i.e., a solvent-to-polymer ratio of the order of 20:1, was believed necessary. Such large proportions of solvent necessarily greatly increased the catalyst poisoning problem. In the present process, however, the proportion of solvent to polymer can be as low as 0.1:1, or even less, thereby maintaining a very high catalyst productivity and efficiency of the system.

It is desirable to maintain the solvent medium substantially anhydrous and free of any possible catalyst poisons, such as moisture and oxygen, by redistilling or otherwise purifying the solvent before use in this process. Treatment with an absorbent such as high surface area silica, aluminas, molecular sieves and like materials are beneficial in removing trace amounts of contaminants that may reduce the polymerization rate or poison the catalyst during reaction.

The use of chain transfer agents, such as hydrogen, are not needed in the process of the present invention, since liquid polymers are readily produced uder the described operating conditions.

The following examples are designed to illustrate the present invention and are not intended as a limitation upon the scope thereof.

EXAMPLES 1–3

A series of three ethylene homopolymerization reactions were conducted under a variety of reaction conditions. The catalyst used in each reaction was 0.02 gram of di(cyclopentadienyl)chromium[II] supported on 0.4 gram of an inorganic oxide support. The organochromium compound used was one in which $n$ and $n'$, as defined above, were both 0. The support had been previously activated by being heated for 24 hours at 650° C. The organo-chromium compound was deposited on the support as a solution in hexane, as follows: The organochromium compound was added to a 6 oz. bottle half filled with nitrogen purged hexane, and the organochromium compound was allowed to dissolve in the hexane. Then 0.4 gram of the dried support was added and stirred for several minutes. The catalyst/hexane system was then transferred under nitrogen pressure to a 1 liter pressure vessel which had been previously purged with nitrogen and then charged with 500 ml. of dried hexane.

The polymerization reactions were then conducted by bringing the contents of the reaction vessel to the desired reaction temperature and then ethylene was charged into the system under a pressure of 300 p.s.i.g. The reactions were conducted for one hour.

The types of the inorganic oxide supports used in the various catalysts, the temperature of the reactions and the hydrocarbon fraction content of the resulting liquid polymers are listed below in Table I. Yields of the liquid polymers ranged from 10 to 30 grams.

The supports used in the three examples had surface areas of, respectively, 258 m.²/gm., 500 m.²/gm. and 700 m.²/gm.

TABLE I.—PREPARATION OF LOW MOLECULAR WEIGHT HYDROCARBON POLYMERS

| Support | Reaction temp., °C. | Fractionated hydrocarbon product, percent | | | | | | |
|---|---|---|---|---|---|---|---|---|
| | | $C_8$ | $C_{10}$ | $C_{12}$ | $C_{14}$ | $C_{16}$ | $C_{18}$ | $C_{20}$ |
| Example: | | | | | | | | |
| 1 ........................ MSID-SiO₂ | 170 | 55.2 | 23.5 | 7.1 | 6.2 | 3.9 | 2.3 | 1.2 |
| 2 ........................ SiO₂-Al₂O₃ | 165 | 17.41 | 15.90 | 14.16 | 12.52 | 11.07 | 14.97 | 14.15 |
| 3 ........................ 968-SiO₂ | 160 | 22.94 | 18.03 | 15.28 | 13.30 | 11.88 | 12.18 | 6.4 |

What is claimed is:

1. A process for producing liquid polymers from olefin monomers which comprises contacting a monomer charge comprising at least one alpha-olefin, in the substantial absence of catalyst poison and chain transfer agent, with catalytic quantities of a bis(cyclopentadienyl)chromium [II] compound supported on activated inorganic oxide support selected from the group consisting of silica and silica-alumina, in an inert organic solvent, at a temperature of $\geq 160°$ C. and at a pressure of about 0 to 1,000 p.s.i.g., said chromium compound having the structure

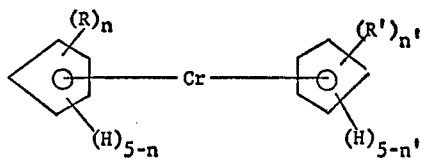

wherein R and R' are the same or different $C_1$ to $C_{20}$, inclusive hydrocarbon radicals, and $n$ and $n'$ are the same or different integers of 0 to 5, inclusive.

2. A process as in claim 1 in which the monomer charge comprises ethylene.

3. A process as in claim 2 in which ethylene is homopolymerized.

References Cited
UNITED STATES PATENTS

| | | | |
|---|---|---|---|
| 3,163,682 | 12/1964 | Walker et al. | 260—683.9 |
| 3,134,824 | 5/1964 | Walker et al. | 260—683.15 |
| 3,157,712 | 11/1964 | Walker et al. | 260—683.15 |
| 3,379,706 | 4/1968 | Wilke | 260—94.3 |
| 3,472,910 | 10/1969 | Favis | 260—683.15 |
| 3,454,538 | 7/1969 | Naarmann et al. | 260—683.15 X |
| 3,620,981 | 11/1971 | Magoon et al. | 252—429 R |
| 3,627,700 | 12/1971 | Zuech | 260—683.15 X |

PAUL M. COUGHLAN, JR., Primary Examiner

U.S. Cl. X.R.

260—680 B